United States Patent [19]

Kouno

[11] Patent Number: 4,858,497
[45] Date of Patent: Aug. 22, 1989

[54] HYDRAULIC CONTROL SYSTEM FOR CONTINUOUSLY VARIABLE TRANSMISSION FOR AUTOMOTIVE VEHICLE

[76] Inventor: Katsumi Kouno, 375-1, Imazato, Susono-shi, Shizuoka-ken, Japan

[21] Appl. No.: 75,724

[22] Filed: Jul. 20, 1987

[30] Foreign Application Priority Data

Jul. 22, 1986 [JP] Japan .................................. 61-172566

[51] Int. Cl.$^4$ ............................................. B60K 41/12
[52] U.S. Cl. ..................................... 74/866; 364/424.1
[58] Field of Search ......................... 74/866; 364/424.1

[56] References Cited

U.S. PATENT DOCUMENTS

4,653,005  3/1987  Osanai ..................................... 474/18
4,671,138  6/1987  Nobumoto ............................. 74/862

Primary Examiner—Andrew J. James
Assistant Examiner—David Soltz
Attorney, Agent, or Firm—Oliff & Berridge

[57] ABSTRACT

A hydraulic control system for a continuously variable transmission for an automotive vehicle, the transmission having a first and a second variable-diameter pulley provided on respective second shafts, a belt connecting the first and second pulleys, and a first and a second hydraulic cylinder for changing effective diameters of the pulleys. The system includes a first pressure regulating valve, a shift-control valve for applying the first line pressure to one of the cylinders, and a second pressure regulating valve for regulating a pressure of the fluid flowing from the other cylinder, and thereby establishing a second line pressure. The system further includes a control device for controlling the shift-control valve so that an actual speed ratio of the transmission coincides with a target speed ratio determined depending upon a running condition of the vehicle. The control device is adapted to effect a feedback control of the first pressure regulating valve, to regulate the first line pressure so that a control error between the actual and target speed ratios coincides with a predetermined constant target value.

7 Claims, 8 Drawing Sheets

HYDRAULIC CONTROL SYSTEM FOR CONTINUOUSLY VARIABLE TRANSMISSION FOR AUTOMOTIVE VEHICLE

BACKGROUND OF THE INVENTION

1. Field of the Invention

The present invention relates in general to a hydraulic control system for a continuously variable transmission of a belt-and-pulley type for a motor vehicle, and more particularly to such a hydraulic control system for regulating a first line pressure for a high-pressure side hydraulic cylinder, based on an error or difference between actual and target speed ratios of the transmission.

2. Discussion of the Related Art

A belt-and-pulley type of continuously variable transmission for an automotive vehicle is known. This transmission includes a first shaft, a second shaft, a first variable-diameter pulley provided on the first shaft, a second variable-diameter pulley provided on the second shaft, a transmission belt connecting the first and second pulleys to transmit power from the first shaft to the second shaft a first hydraulic cylinder for changing an effective diameter of the first pulley, and a second hydraulic cylinder for changing an effective diameter of the second pulley. An example of a hydraulic control system for controlling this type of continuously variable transmission is disclosed in Japanese Patent Application No. 61-37571 (filed Feb. 22, 1986) the subject matter of which is disclosed in U.S. patent application, Ser. No. 016,661 filed Feb. 19, 1987, assigned to the assignee of the present application. The hydraulic control system disclosed therein includes (a) a first pressure regulating valve for regulating a pressure of a pressurized fluid delivered from a hydraulic source, and thereby establishing a first line pressure, (b) a shift-control valve for applying the first line pressure to one of the first and second hydraulic cylinders, while simultaneously permitting a flow of the fluid from the other hydraulic cylinder, thereby changing the effective diameters of the first and second pulleys to control a speed ratio of the transmission, and (c) a second pressure regulating valve for regulating the pressure of a discharge flow of the fluid flowing from the above-indicated other hydraulic cylinder through the shift-control valve, and thereby establishing a second line pressure which is lower than the first line pressure. The shift-control valve is controlled so that the actual speed ratio of the transmission coincides with a target or desired speed ratio.

In the continuously variable transmissions as discussed above, the first and second line pressures are regulated by the respective first and second pressure regulating valves. More specifically, the first pressure regulating valve is controlled so as to maintain the first line pressure at a lowest level required to permit the drive-side pulley to provide a thrust necessary to establish the target speed ratio while minimizing a power loss of the system, while the transmission is operating with its speed ratio kept at a substantially constant level. On the other hand, while the transmission is being shifted at a relatively high rate, the first line pressure is regulated so as to enable the transmission to have a relatively high operating response, i.e., a sufficiently high rate of change of the speed ratio. In the meantime, the second pressure regulating valve is controlled so as to maintain the second line pressure at a lowest level required to enable the transmission to operate without a slip of the belt on the pulleys. Thus, the first and second line pressures are regulated so that the transmission exhibits a sufficiently high response during a shifting operation, while minimizing the power loss in the transmission system of the vehicle.

PROBLEM SOLVED BY THE INVENTION

In the hydraulic control system discussed above, a thrust of the driven-side pully necessary to give the belt a tension sufficient to transmit a torque is first calculated, and then a thrust of the drive-side pulley is calculated based on the calculated thrust of the driven-side pulley, and a thrust ratio of the driven-side pulley and the drive-side pulley (ratio of the thrust forces of the two pulleys), which is predetermined depending upon the target speed ratio and actual output torque of the transmission. Subsequently, a pressure to be applied to the drive-side hydraulic cylinder is calculated based on the calculated thrust of the drive-side pulley, and a desired first line pressure is determined by adding a suitable extra value to the calculated pressure of the drive-side hydraulic cylinder. The first pressure regulating valve is activated to establish the determined desired first line pressure.

The above-indicated extra pressure is necessary in order to reduce the control error of the speed ratio of the transmission. FIGS. 8(a) and 8(b) show operating characteristics of a shift-control valve indicated above. Suppose the transmission is given a certain speed ratio while the pressures Pin and Pout in the first and second hydraulic cylinders are at the levels indicated by black dots in the figures, there exists a control error between the actual speed ratio and the target speed ratio of the transmission, which error corresponds to a control value $\Delta Vo$ applied to the shift-control valve (an amount of movement of a valve spool of the valve). This error decreases as the first line pressure pll is raised, since the pressures Pin and Pout change at a higher rate with the control value Vo, as indicated in FIG. 8(b). Conversely, the error increases as the first line pressure Pl1 is lowered, since the pressures Pin and Pout change at a lower rate with the control value Vo, as indicated in FIG. 8(a). However, the first line pressure Pl1 has an upper limit, since a rise of this pressure causes an increase in the power loss of the pump of the hydraulic source. Therefore, the extra pressure $\Delta P1$ is determined so as to provide an optimum compromise between the minimum power loss of the pump, and the mininum control error of the speed ratio of the transmission.

It is also recognized that the thrust ratio of the first and second pulleys does not always accurately correspond to the speed ratio of the transmission actually established with that thrust ratio, due to changes in the sliding resistances of the individual components of the same transmission, and deterioration of the lubricant in the hydraulic system. Further, the relationship between the thrust ratio and the speed ratio differs from one transmission to another. Accordingly, it is very difficult to use a fixed relationship between these variables, or to change the relationship with the chronological change of the transmission. Moreover, the first and second pressure regulating valves are limited in their operating accuracy, and are not capable of regulating the first and second line pressures exactly to the calculated levels.

In order to maintain the control error of the speed ratio of the transmission according to the hydraulic control system disclosed in the above-identified document, therefore, it is necessary that a relatively large extra pressure be added to the calculated value to establish the desired first line pressure, for accommodating a calculating error of the pressure to be applied to the drive-side hydraulic cylinder, and/or a control error of the first and second line pressures. In this arrangement, the first line pressure tends to be controlled to an unnecessarily high level, when the above indicated errors are relatively small or when the transmission is new and its components have experienced relatively small chronological changes. This use of the unnecessarily high first line pressure will lead to increased power loss of the pump, resulting in increased power loss of the engine of the vehicle and consequently reduced fuel economy of the vehicle.

SUMMARY OF THE INVENTION

It is accordingly an object of the present invention to provide an improved hydraulic control system for a continuously variable transmission for an automotive vehicle, which is capable of ameliorating the problems described above.

The above object may be attained according to the principle of the present invention, which provides a hydraulic control system for a continuously variable transmission of a belt-and-pulley type for an automotive vehicle, the transmission having a first and a second shaft, a first and second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, the hydraulic control system comprising: (a) a hydraulic pressure source for pressurizing a working fluid; (b) a shift-control valve receiving a first line pressure from the pressure source through a first pressure line, and applying the first line pressure to one of the first and second hydraulic cylinders, while simultaneously permitting a flow of the fluid from the other hydraulic cylinder, thereby changing the effective diameters of the first and second pulleys to control a speed ratio of the transmission; (c) a second pressure line connected to the shift-control valve to receive therefrom a pressure of the fluid flowing from the other hydraulic cylinder; and (d) control means for controlling the shift-control valve so that an actual speed ratio of the transmission coincides with a target speed ratio determined depending upon a running condition of the vehicle. The control means is further operable for effecting a feedback control of the first pressure regulating valve, to regulate the first line pressure so that a control error between the actual speed ratio and the determined target speed ratio of the transmission coincides with a predetermined constant target value.

In the hydraulic control system of the present invention constructed as described above which has the first and second pressure regulating valves and the shift-control valve, the first pressure regulating valve is activated by means of a feedback control by the control means, in which the control error between the actual and target speed ratios of the transmission is controlled into conformity with the predetermined target value, relying on the fact that the control error decreases with an increase in the first line pressure. According to this control arrangement, the first line pressure is regulated to the lowest level that is required to establish the actual speed ratio of the transmission which includes a suitable amount of difference from the target speed ratio, i.e., the predetermined target value of the control error. Therefore, the instant hydraulic control system encounters reduced power loss of a pump of the hydraulic source, and consequently reduced power loss of the engine of the vehicle, resulting in increased fuel economy of the vehicle, as compared with a hydraulic control system developed by the assignee of the present application, as disclosed in the U.S. Patent Application identified above.

The target value with which the control error coincides is determined so as to establish an optimum condition of the vehicle, by a suitable method, for example, based on results of a comprehensive experiment or simulation wherein the vehicle is tested in various running conditions such as those used in a so-called 10-mode test. Alternatively, the target value is determined to be a smallest one of the optimum control error values that are found in various running conditions of the vehicle. If the target value of the control error is determined in order to assure a minimum fuel consumption of the vehicle, the first line pressure is controlled so as to minimize the fuel consumption. In this case, the fuel economy is considerably improved.

Further, the instant hydraulic control system permits the first pressure regulating valve to regulate the first line pressure at a required minimum level, irrespective of control errors of the first and second line pressures. In other words, the instant system does not require the first and second pressure regulating valves to be highly accurate in their pressure regulating functions. While the control error of the speed ratio of the transmission is also influenced by the operating characteristics of the shift-control valve, an influence due to a variation in the operating characteristics of the shift-control valve may be overcome, since the first pressure regulating valve is controlled based on the control error of the actual speed ratio with respect to the target value. Therefore, the present hydraulic control system does not require the use of expensive, highly accurate control valves as the first and second pressure regulating valves and the shift-control valves. Accordingly, the hydraulic control system is available at a comparatively reduced cost.

According to one feature of the invention, the control means is adapted to determine the first line pressure according to an equation which includes a proportional control action term representing a variable which is proportional to a difference between the control error and the predetermined constant target value. The control means controls the first pressure regulating valve so as to establish the determined first line pressure.

In one form of the above feature of the invention, the equation further includes an integral control action term representing a variable which is proportional to an integral of the difference.

In another form of the same feature of the invention, the equation further includes a differential control action term representing a variable which is proportional to a derivative of the difference.

According to another feature of the invention, the control means is adapted to determine the first line pressure by adding a compensation value to a predetermined pre-compensated programed value of the first line pressure, according to the following equation:

$$Pl1 = P'l1 + Kp\{[(|e^* - e|/e) - \epsilon] + 1/Ti \int [(|e^* - e|/e) - \epsilon] dt\}$$

where,

P11: the first line pressure

P'11: the pre-compensated value of the first line pressure

Kp: proportional gain e: the actual speed ratio of the transmission e*: the target speed ratio of the transmission (|e*−e|/e): the control error ϵ: the predetermined constant target value Ti: integral time.

In one form of the above feature of the invention, the control means includes means for determining a pressure Pin' or Pout' in the above-indicated one of the first and second hydraulic cylinders, based on the target speed ratio e*, an actual output torque Te of the transmission, a pressure-receiving area Ain or Aout of the first and second hydraulic cylinders, and a rotating speed Nin or Nout of the first or second shaft, and according to a predetermined relation which is formulated to enable the above-indicated one hydraulic cylinder to provide a thrust necessary to establish the target speed ratio e* of the transmission. The control means further includes means for determining the pre-compensated value P'1 of the first line pressure by adding an extra value ΔP1 to the pressure Pin' or Pout'.

According to a further feature of the invention, the control means determines the first line pressure according to the following equation:

$$Pl1 = Kp\{[((|e^*-e|/e)-\epsilon] + 1/Ti \int [(|e^*-e|/e)-\epsilon]dt + Td \cdot d/dt[(|e^*-e|/e)-\epsilon]\}$$

where,

P11: the first line pressure

Kp: proportional gain e: the actual speed ratio of the transmission e*: the target speed ratio of the transmission (|e*−e|/e): the control error ϵ: the predetermined constant target value Ti: integral time Td: differential or derivative time

BRIEF DESCRIPTION OF THE DRAWINGS

The above and optional objects, features and advantages of the present invention will become more apparent by reading the following detailed description of preferred embodiments of the invention, when considered in connection with the accompanying drawings, in which.

DETAILED DESCRIPTION OF THE PREFERRED EMBODIMENTS

The preferred embodiments of the present invention will be described in detail.

Figure 1:
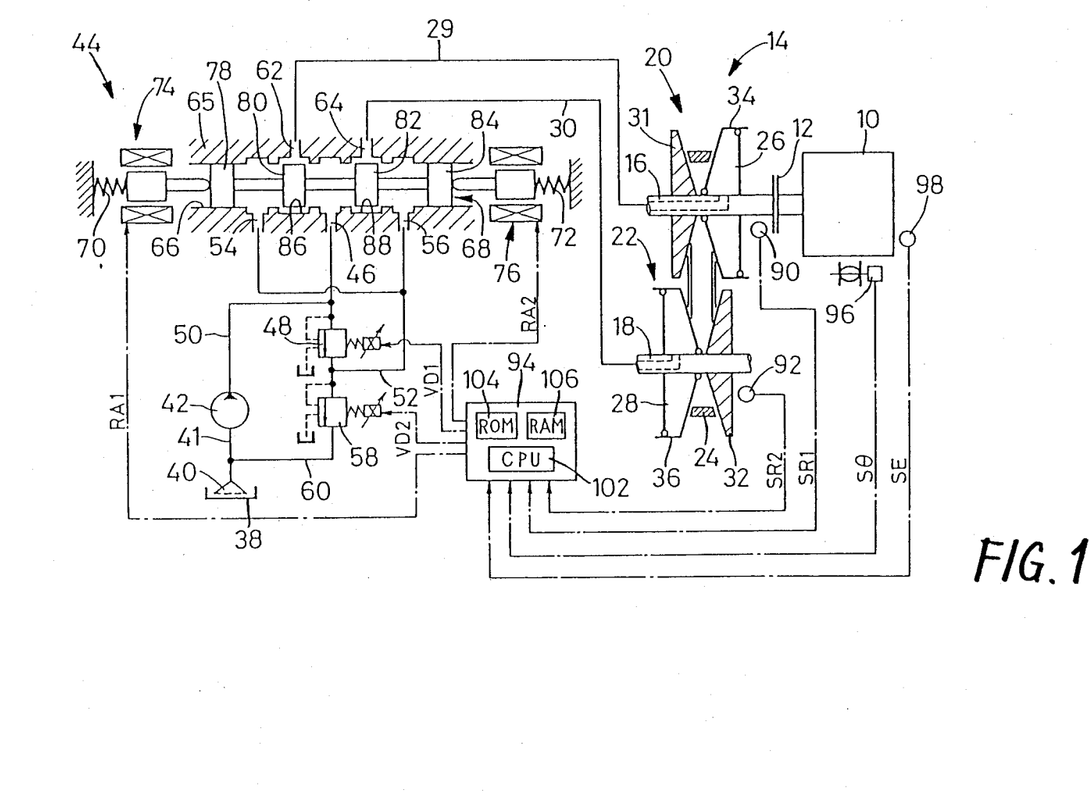
FIG. 1 is a schematic view showing an arrangement of one embodiment of a hydraulic control system of the present invention for controlling a continuously variable transmission.

Referring first to FIG. 1, there is shown a hydraulic control system for a continuously variable transmission 14 of a belt-and-pulley type for a motor vehicle. The transmission 14 includes a first shaft 16 to which an output of an engine 10 of the vehicle is transmitted via a clutch 12.

The continuously variable transmission 14 including the first shaft 16 further includes a second shaft 18, a first variable-diameter pulley 20 provided on the first shaft 16, a second variable-diameter pulley 22 provided on the second shaft 18, a belt 24 connecting the first and second pulleys 20, 22 to transmit power between the first and second shafts 16, 18, and a first and a second hydraulic cylinder 26, 28 for changing effective diameters of the first and second pulleys 20, 22. These first and second hydraulic cylinders 26 and 28 have the same pressure-receiving areas, and the first and second pulleys 20 and 22 have the same size, so that the continuously variable transmission 14 as a whole is relatively small-sized. The first pulley 20 has an axially stationary rotor 31 fixed to the first shaft 16, and an axially movable rotor 34 which is axially movable on the first shaft 16, cooperating with the stationary rotor 31 to form therebetween a V-groove having a variable width. Similarly, the second pulley 22 has an axially stationary rotor 32 and an axially movable rotor 36, which are provided on the second shaft 18 so as to form therebetween a variable-width V-groove.

An output of the second shaft 18 of the continuously variable transmission 14 is transmitted to drive wheels of the vehicle, via an auxiliary transmission, a differential gear, and other units, all of which are not shown.

The thus constructed power transmission system of the vehicle is controlled by a hydraulic control system, which is arranged as described below. The power transmission system uses an oil reservoir 38 to which a working fluid is returned. The fluid in the reservoir 38 is pumped up by an oil pump 42 via a strainer 40 and a suction line 41. The thus pressurized fluid is fed to a first pressure line 50, which is connected to an input port 46 of a shift-control valve 44, and to a first pressure regulating valve 48. In the present embodiment of the hydraulic control system, the oil pump 42 constitutes a hydraulic power source, and is driven by the engine 10 via a drive shaft not shown. The first pressure regulating valve 48 is operated in response to a first VALVE DRIVE signal VD1 (which will be described), to release a portion of the fluid in the first pressure line 50, into a second pressure line 52, and thereby regulate a first line pressure Pl1 in the first peessure line 50. The second pressure line 52 is connected to a first and a second drain port 54, 56 of the shift-control valve 44, and to a second pressure regulating valve 58. This second pressure regulating valve 58 is operated in response to a second VALVE DRIVE signal VD2 (which will be described), to release a portion of the fluid in the second pressure line 52, into a drain line 60, and thereby regulate a second line pressure Pl2 in the second pressure line 52, so that the second line pressure Pl2 is lower than the first line pressure Pl1. The first and second pressure regulating valves 48, 58 are each constituted by a so-called solenoid-operated proportional relief valve.

The shift-control valve 44 is a so-called solenoid-operated proportional control valve, which includes a valve body 65 having: the input port 46; the first and second drain ports 54, 56; a first output port 62 connected to the first cylinder 26 via a conduit 29; a second output port 64 connected to the second cylinder 28 via a conduit 30; and a cylinder bore 66 which communicates with all of these ports 46, 54, 56, 62 and 64. The shift-control valve 44 further includes: a valve spool 68 slidably received in the cylinder bore 66; a first spring 70 and a second spring 72 which are disposed at opposite ends of the valve spool 68, to bias the spool 68 in opposite directions toward a neutral position of the spool 68, thus holding the spool 68 in its neutral position; and a first and a second solenoid 74, 76 which are disposed at the opposite ends of the valve spool 68, to move the spool 68 against the biasing action of the second or first spring 72, 70. The valve spool 68 has formed thereon four lands 78, 80, 82 and 84, which are disposed in the order of description from the end of the spool on the side of the first spring 70. The two intermediate lands 80, 82 are formed such that the lands 80, 82 are aligned with the first and second output ports 62, 64, respectively, in the longitudinal direction of the spool 68, when the spool 68 is placed in its neutral position. The inner surface of the cylinder bore 66 is formed with a first and a second annular groove 86, 88 which are opposite to the intermediate lands 80, 82, respectively, when the spool 68 is placed in its neutral position. In other words, the first and second annular grooves 86, 88 are formed in the spaced-apart portions of the inner surface of the cylinder bore 66, in which the first and second output ports 62, 64 are open. The first and second annular grooves 86, 88 have a width larger than that of the first and second output ports 62, 64, and cooperate with the intermediate lands 80, 82 to form variable flow restrictors which have a continuously variable area of flow of the fluid therethrough.

While the valve spool 68 is placed in the neutral position, the first and second output ports 62, 64 are held in communication with the input port 46, and with the first and second drain ports 54, 56, with a relatively small equal area of communication. Namely, the first and second hydraulic cylinders 26, 28 are supplied with small flows of the fluid from the first and second output ports 62, 64, in order to compensate for leakage flows of the fluid from the cylinders 26, 28. At the same time, small flows of the fluid are discharged from the first and second drain ports 54, 56.

As the valve spool 68 is moved from its neutral position in one of the longitudinal directions, for example, toward the second solenoid 76 (in the right direction as viewed in FIG. 1) the area of communication between the first output port 62 and the first drain port 54 continuously increases, while the area of communication between the second output port 64 and the input port 46 continuously increases. Consequently, the pressure of the fluid to be applied from the first output port 62 to the first cylinder 26 is made lower than that of the fluid to be applied from the second output port 64 to the second cylinder 28. As a result, the equilibrium in the thrust between the first and second cylinders 26, 28 of the transmission 14 is gradually lost, whereby the fluid from the second output port 64 flows into the second cylinder 28, whereas the fluid in the first cylinder 26 is discharged. Thus, the speed ratio e of the transmission 14 (e=Nout/Nin, where Nout: speed of the second shaft 18, Nin: speed of the first shaft 16) is decreased.

Conversely, as the valve spool 68 is moved from the neutral position toward the first solenoid 74 (in the left direction in FIG. 1), the area of communication between the first output port 62 and the input port 46 increases, while the area of communication between the second output port 64 and the second drain port 56 increases. Consequently, the pressure of the fluid to be applied from the first output port 62 to the first cylinder 26 is made higher than that of the fluid to be applied from the second output port 64 to the second cylinder 28. Consequently, the equilibrium in the thrust between the two cylinders 26, 28 is gradually lost, and the fluid is discharged from the second cylinder 28, whereas the fluid flows into the first cylinder 26. As a result, the speed ratio e of the transmission 14 is increased. As described above, the shift-control valve 44 has not only a function of a directional control valve capable of applying a relatively high fluid pressure to one of the cylinders 26, 28 and a relatively low fluid pressure to the other cylinder (i.e., for changing the directions of flow of the fluid to and from the cylinders), but also a function of a flow control valve capable of continuously adjusting rates of flows of the fluid to and from the cylinders 26, 28.

The continuously variable transmission 14 has a first speed sensor 90 for detecting the rotating speed Nin of the first shaft 16, and a second speed sensor 92 for detecting the rotating speed Nout of the second shaft 18. The first and second speed sensors 90, 92 produce first and second ROTATION signals SR1 and SR2 indicative of the rotating speeds Nin and Nout, respectively, which signals SR1 and SR2 are applied to a controller 94. Further, the engine 10 is provided with a throttle sensor 96 for sensing a current throttle position $\theta$th of a throttle valve disposed in an intake manifold, and also with an engine-speed sensor 98 for sensing a current speed Ne of the engine 10. The throttle sensor 96 produces a THROTTLE signal S $\theta$ indicative of the current throttle position $\theta$th and the engine-speed sensor 98 produces an ENGINE SPEED signal SE indicative of the current engine speed Ne. These signals are also applied to the controller 94.

The controller 94 indicated above, which serves as control means for the hydraulic control system for the transmission 14, is constituted by a so-called microcomputer which includes a CPU 102 (central processing unit), a ROM 104 (read-only memory), a RAM 106 (random-access memory). The CPU 102 is adapted to process various input signals according to control programs stored in the ROM 104, while utilizing a temporary data storage function of the RAM 106. According to the processed input signals, the CPU 102 applies to the first and second pressure regulating valves 48, 58 the first and second VALVE DRIVE signals VD1 and VD2, for regulating the pressures in the first and second pressure lines 50, 52. Further, the CPU 102 feeds to the first and second solenoids 74, 76 first and second SPEED RATIO signals RA1 and RA2 for controlling the speed ratio e of the transmission 14.

Referring next to the flow chart of FIGS. 2 and 3, the operation of the present hydraulic control system for the transmission 14 will be described.

Initially, the CPU 102 executes step S1, wherein the rotating speed Nin of the first shaft 16, the rotating speed Nout of the second shaft 18, the throttle position θth, and the engine speed Ne are read and stored into the RAM 106, according to the first and second ROTATION signals SR1, SR2, the THROTTLE SIGNAL S8, and the ENGINE SPEED signal SE. Then, the CPU 102 goes to step S2 in which the speed ratio e is calculated or determined based on the stored speeds Nin and Nout, according to the following equation (1) stored in the ROM 104:

$$e = Nout/Nin \tag{1}$$

Figure 4:
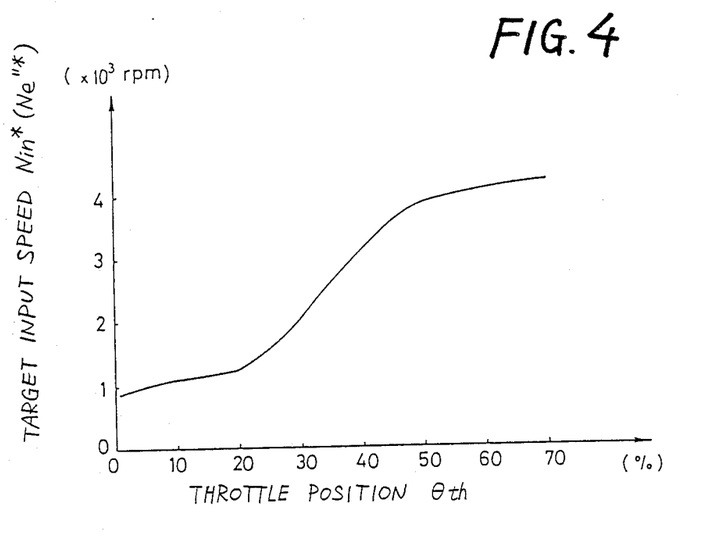
FIG. 4 is a view showing a relationship used in the operation illustrated in FIGS. 2 and 3.
Figure 5:
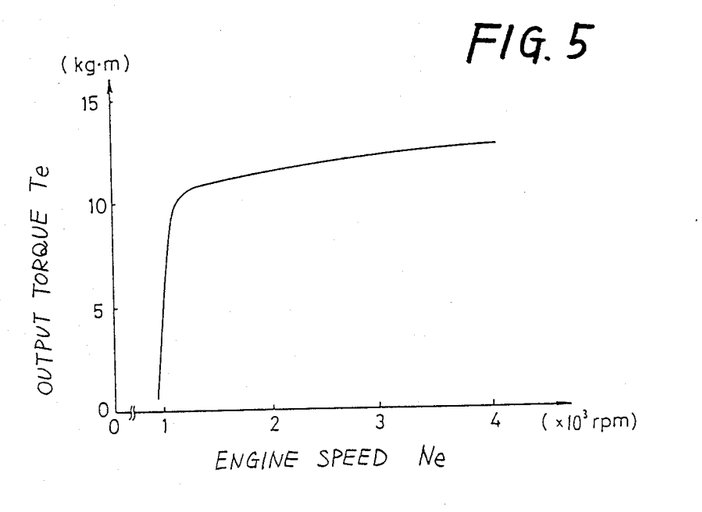
FIG. 5 is a view showing a speed-output torque curve for minimum fuel consumption by an engine.

Step S2 is followed by step S3 wherein a desired or target input speed Nin* of the first shaft 16 is determined based on the stored throttle position θth and other variables, according to a predetermined relation stored in the ROM 104. Based on the determined target input speed Nin* and the stored speed Nout, a target speed ratio e* is determined according to the above equation (1). The relation for determining the target input speed Nin* is shown in FIG. 4, by way of example only. This relation is predetermined so as to operate the engine 10 with a minimum fuel consumption, according to a torque-speed curve indicated in FIG. 5. In the following step S4, a speed-ratio control value Vo is determined according to the following equation (2) stored in the ROM 104:

$$Vo = k(e^* - e)/e \tag{2}$$

where, k: control constant

Figure 6:
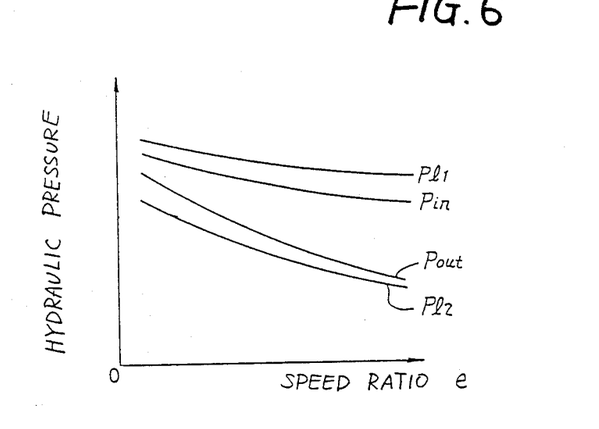
FIGS. 6 and 7 are views representing changes in hydraulic pressures in the hydraulic control system, in relation to the speed ratio of the continuously variable transmission, FIG. 6 showing the changes while the engine is producing a positive torque, and FIG. 7 showing the changes while the engine is providing a braking effect.
Figure 7:
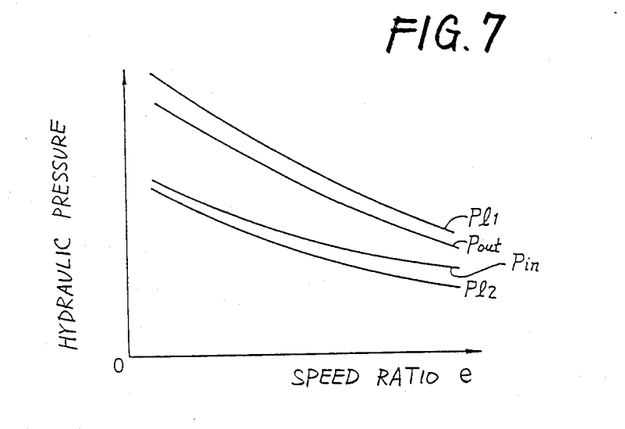

In step S5, an actual output torque Te of the engine 10 is determined based on the throttle position θth and the engine speed Ne, according to a well known relationship stored in the ROM 104. In the next step S6, the CPU 102 checks to see if the output torque Te of the engine 10 is positive or not, namely, to see if the engine 10 is placed in a positive-torque condition providing a positive torque, or in an engine-brake condition providing a braking effect to the vehicle. This judgment is necessary because the pressure changing characteristics of the hydraulic cylinders 26, 28 in relation to the speed ratio e differ depending upon the direction of power transmission, that is, depending upon whether the engine 10 is in the positive-torque condition or the engine-brake condition. Described more specifically, FIGS. 6 and 7 show changes in pressures Pin and Pout in the first and second cylinders 26, 28, in relation to the speed ratio e of the transmission 14, when the engine 10 is placed in the positive-torque and engine-brake conditions, respectively. As indicated in these figures, the magnitudes of the pressures Pin and Pout are reversed when the engine 10 is switched from the positive-torque condition to the engine-brake condition, or vice versa. Namely, the pressure in one of the cylinders 26, 28 which is provided on the drive shaft (input shaft 16 in the positive-torque condition, or output shaft 18 in the engine-brake condition), is higher than the pressure in the other cylinder provided on the driven shaft. Although this phenomenon should be discussed in terms of the magnitudes of the thrust forces produced by the first and second cylinders 26, 28, the phenomenon has been discussed in terms of the pressures of the fluid in the two cylinders 26, 28, since the two cylinders have the same pressure-receiving areas.

If the checking in step S6 reveals that the output torque Te is positive, step S6 is followed by step S7 in which the second line pressure Pl2 is determined so as to obtain a pressure (target pressure) Pout' of the second cylinder 28 necessary to establish a required minimum tension of the transmission belt 24. More specifically, an optimum thrust Wout' (calculated value) of the second cylinder 28 is first obtained based on the actual output torque Te of the engine 10 and the actual speed ratio e of the transmission 14, according to the following equation (3) stored in the ROM 104. Further, the pressure Pout' is obtained based on the determined thrust Wout' and pressure-receiving area Aout of the second cylinder 28, and on the rotating speed Nout of the second shaft 28, according to the following equation (4) stored in the ROM 104. Then, a compensation value ΔP2 is determined based on the actual speed ratio e, the determined target speed ratio e*, and the determined actual output torque Te, according to the following equation (5) also stored in the ROM 104.

$$Wout' = f(Te, e) \tag{3}$$

$$Pout' = \frac{Wout'}{Aout} - C2 \, Nout^2 \tag{4}$$

$$\Delta P2 = f(e, e^*, Te) \tag{5}$$

$$Pl2 = Pout' - \Delta Pl2 \tag{6}$$

The equation (3) is predetermined so as to establish the required minimum tension of the transmission belt 24, i.e., a required minimum force acting on the belt 24. The thrust Wout' is changed as a function of the output torque Te and the speed ratio e. The second term of the equation (4) is a centrifugal pressure which increases with the speed Nout, and which is subtracted from the first term of the equation to correct the pressure Pout'. A value C2 in the second term is a centrigual-force compensating constant which is predetermined by the specifications of the second cylinder 28, and the specific gravity of the working fluid used.

The equation (5) for determining the compensation value ΔP2 will be described. FIGS. 8(a) and 8(b) show changes in the pressures Pin and Pout in the first and second cylinders 26, 28, in relation to a speed-ratio control value Vo applied to the shift-control valve 44 (in relation to the position of the valve spool 68), at different levels of the first and second line pressures Pl1 and Pl2. Suppose the speed-ratio control value Vo is ΔVo, the pressure Pout in the second cylinder 28 is higher than the second line pressure Pl2 by an amount equal to the compensation value ΔP2. Therefore, the second line pressure Pl2 to be controlled is determined by subtracting the compensation value ΔP2 obtained from the equation (5), from the pressure Pout' obtained from the equation (4). The compensation value ΔP2 is determined by the output characteristics of the shift-control valve 44 the speed-ratio control value Vo, and a line pressure difference (Pl1−Pl2), while the speed-ratio control value Vo is determined by a difference (e*−e). Further, the line pressure difference (Pl1−Pl2) is determined by the actual output torque Te and the actual speed ratio e. Consequently, the compensation value ΔP2 is determined as a function of the speed ratio e, target speed ratio e* and output torque Te, as indicated by the equation (5). In this connection, it is noted that the compensation value $\Delta P2$ may be held relatively low over the entire range of the speed-ratio control value Vo, if the shft-control valve 44 has specific output charcteristics. In this case, the compensation value $\Delta P2$ may be a predetermined constant value.

In the next step S8, a pre-compensation value P'l1 of the first line pressure Pl1 to be regulated by the first pressure regulating valve 48 is determined so as to obtain a pressure (target pressure) Pin' of the first cylinder 26 necessary to produce a required miminum thrust for establishing the target speed ratio e*. Described more specifically, a thrust ratio $\gamma+$ of the two cylinders 26, 28 (Wout of the cylinder 28/Win of the cylinder 26) in the positive-torque condition of the engine 10 is first calculated based on the target speed ratio e* and the actual output torque Te of the engine 10, according to the following equation (7). Then, a thrust Win' of the first cylinder 26 is obtained based on the calculated thrust ratio $\gamma+$ and the calculated thrust Wout' of the second cylinder 28, according to the following equation (8). Further, a pressure Pin' (calculated value) is obtained based on the calculated thrust Win' and the pressure-receiving area Ain of the first cylinder 26, and the rotating speed Nin of the first shaft 16, according to the following equation (9). Then, the pre-compensation value P'l1 of the first line pressure Pl1 is calculated based on the calculated pressure Pin' and an extra value $\Delta P1$, according to the following equation (10). The pre-compensation value P'l1 is hereinafter referred to as "pre-compensated first line pressure P'l1".

$$\gamma+ = f(e^*, Te) \quad (7)$$

$$Win' = \frac{Wout'}{\gamma+} \quad (8)$$

$$Pin' = \frac{Win'}{Ain} - C1\, Nin^2 \quad (9)$$

$$P'l1 = Pin' + \Delta P1 \quad (10)$$

The equation (7) is a relationship predetermined so as to obtain the required thrust ratio $\gamma+$ of the two cylinders 26, 28 over the entire operating range of the transmission 14, in relation to the target speed ratio e* and actual output torque Te. The second term of the equation (9) is a centrifugal pressure which increases with the speed Nin, which is subtracted from the first term of the equation. A value C1 is a constant determined by the specifications of the first cylinder 26 and the specific gravity of the working fluid. The equation (10) is provided to determine the pre-compensated first line pressure P'l1 by adding the extra value $\Delta P1$ to the pressure Pin' calculated from the equation (9).

The above extra value $\Delta P1$ is necessary to reduce a control error ($|e^*-e|/e$), which is a difference between the target speed ratio e* and the actual speed ratio e, divided by the actual speed ratio e. This aspect of the invention will be described more particularly, referring to FIGS. 8(a) and 8(b) showing the output characteristics of the shift-control valve 44. Suppose a current speed ratio e of the transmission 14 is established while the pressure Pin and Pout of the first and second cylinders 26, 28 are at the levels indicated by dots "●" in the figures, the error ($|e^*-e|/e$) corresponds to the value $\Delta Vo$, since the speed-ratio control value Vo is expressed by the equation (2) indicated above. This error ($|e^*-e|/e$) decreases as the first line pressure Pl1 rises, as indicated in FIG. 8(b), since the gradient of the curves of the pressures Pin and Pout increases with an increase in the first line pressure Pl1. On the other hand, the error increases as the first line pressure is lowered, as indicated in FIG. 8(a), since the gradient of the curves decreases with a decrease in the first line pressure Pl1. However, an increase in the first line pressure Pl1 will accordingly increase a power loss of the pump 42. Hence, the extra value $\Delta P1$ is determined so as to provide an optimum compromise between the power loss of the pump 42, and the error ($|e^*-e|/e$).

In the checking in step S6 reveals that the determined output torque Te of the engine 10 is equal to zero or negative, that is, the engine 10 is presently in the engine-brake condition, with power being transmitted from the vehicle wheels to the engine, step S6 is followed by steps S9 and S10 similar to steps S7 and S8. In these steps S9 and S10, the second line pressure Pl2 and the pre-compensated first line pressure P'l1 are determined, based on the pressures Pin' and Pout' required for the second and first cylinders 28, 26, respectively. More specifically, step S9 is executed to: determine the optimum thrust Win' of the first cylinder 26 based on the determined actual torque Te and speed ratio e, according to the following equation (11) stored in the ROM 104; calculate the pressure Pin' to be applied to the first cylinder 26, according to the following equation (12) also stored in the ROM 104; determine the compensation value $\Delta P2$, according to the equation (5) previously indicated; and determine the second line pressure Pl2 based on the pressure Pin' and compensation value $\Delta P2$, according to the following equation (13). The next step S10 is executed to: calculate a thrust ratio $\gamma-$ of the two cylinders 26, 28 based on the target speed ratio e* and output torque Te, according to the following equation (14); obtain the thrust Wout' of the second cylinder 28 based on the calculated thrust ratio $\gamma-$ and thrust Win' of the first cylinder 26, according to the following equation (15); calculate the pressure Pout' in the second cylinder 28 according to the following equation (16); determine the pre-compensated first line pressure P'l1 based on the calculated pressure Pout' and extra value $\Delta P1$, according to the following equation (17).

$$Win' = f(Te, e) \quad (11)$$

$$Pin' = \frac{Win'}{Ain} - C1\, Nin^2 \quad (12)$$

$$Pl2 = Pin' - \Delta P2 \quad (13)$$

$$\gamma- = f(e^*, Te) \quad (14)$$

$$Wout' = \gamma- Win' \quad (15)$$

$$Pout' = \frac{Wout'}{Aout} - C2\, Nout^2 \quad (16)$$

$$P'l1 = Pout' + \Delta P1 \quad (17)$$

After steps S7 and S8 or steps S9 and S10 have been executed as described above to determine the second line pressure Pl2 and the pre-compensated first line pressure P'l1, the next step S11 is executed to check if the control error ($|e^*-e|/e$) is smaller than a predetermined value E or not. This value E is determined to be sufficiently small. If the error ($|e^*-e|/e$) is smaller than the predetermined small value E, this means that the transmission 14 is operating with a very small or substantially no difference between the target and actual speed ratios $e^*$ and e, namely, the actual speed ratio e is being changed at a very low rate or held substantially constant. If the error ($|e^*-e|/e$) is equal to or larger than the predetermined value E, this means that the actual speed ratio e of the transmission is being changed at a comparatively high rate.

In the case where the error ($|e^* e|/e$) is smaller than the predetermined value E or the transmission 14 is operated at a substantially constant speed ratio e, step S11 is followed by step S12 wherein a feedback value is added to the pre-compensated first line pressure P'l1 determined in step S8 or S10, according to the following equation (18), whereby the first line pressure Pl1 to be controlled by the first pressure regulating valve 48 is adjusted so that the error ($|e^*-e|/e$) coincides with a predetermined constant target value $\epsilon$.

$$Pl1 = P'l1 + Kp\{[(|e^*-e|/e) - \epsilon] + 1/Ti \int [(|e^*-e|/e) - \epsilon] dt\} \quad (18)$$

where,
Kp: proportional gain
Ti: integral time

As indicated above, the feedback or compensation value to be added to the first line pressure consists of a proportional control action term $P = Kp [(|e^*-e|/e) - \epsilon]$, and an integral control action term $I = 1/Ti \int [(|e^*|e|/e) - \epsilon] dt$. The target value $\epsilon$ with which the control error ($|e^*-e|/e$) coincides is determined so as to minimize the fuel consumption of the engine 10, by a suitable method, for example, based on results of a comprehensive experiment or simulation wherein the vehicle is tested in various conditions such as those used in a so-called 10-mode test. Alternatively, the target value $\epsilon$ is determined to be a smallest one of the optimum error values ($|e^*-e|/e$) for minimum fuel consumption of the engine 10 in corresponding different running conditions of the vehicle. The first line pressure Pl1 is compensated so that the error ($|e^*-e|/e$) coincides with the thus predetermined target value $\epsilon$.

For example, if the actual first line pressure is lower than the optimum level, the error ($|e^*-e|/e$) is larger than the target value, the value $[(|e^*-e|/e) - \epsilon]$ is positive. In this case, the proportional control action term P goes positive, and the integral control action I increases. Therefore, the first line pressure Pl1 is increased by adding a feedback value consisting of the above term P and I to pre-compensated line pressure P'l1. Based on this compensated first line pressure Pl1, the first line-pressure control value V1 is determined in step S14 and applied to the shift-control value 44 in step S15, so as to raise the actual first line pressure, so that the error ($|e^*-e|/e$) is reduced down to the target value $\epsilon$.

On the other hand, if the actual first line pressure is higher than the optimum level, the error ($|e^*-e|/e$) is smaller than the target value $\epsilon$, the value $[(|e^*-e|/e) - \epsilon]$ negative. In this case, the proportional control action term P goes to negative, and the integral control action term I decreases. Therefore, the first line pressure Pl1 is decreased by adding a feedback value consisting of the above term P and I to pre-compensated line pressure P'l1. Based on this compensated first line pressure Pl1, the first line-pressure control value V1 is determined and applied in steps S14 and S15, so as to lower the actual first line pressure, so that the error ($|e^*-e|/e$) is increased up to the target value $\epsilon$.

When the control error ($|e^*-e|/e$) has coincided with the target value $\epsilon$, the actual first line pressure is controlled to a minimum level necessary to establish the speed ratio e which includes the target value $\epsilon$. Namely, the step S12 is implemented for the purpose of compensating or adjusting the pre-compensated first line pressure P'l1 determined in the previous step S8 or S10, according to the error ($|e^*-e|/e$), so that the actual first line pressure is regulated to the permissible lowest level. This arrangement permits reduction in the power loss of the pump 42, thereby assuring improved fuel economy of the vehicle. Although the equation (18) used in the present embodiment uses both of the proportional control action term P and the integral control action term I, it is possible that either one of these two terms may be used to compensate the determined first line pressure.

If the checking in step S11 reveals that the error ($|e^*-e|/e$) is equal to or larger than the predetermined value E, namely, if the transmission 14 is in a transient state with its speed ratio changing, step S11 is followed by step S13 wherein the pre-compensated first line pressures P'l1 and the second line pressure Pl2 are compensated according to the following equations (19) and (20).

$$Pl1 = P'l1 + K1(|e^*-e|/e) \quad (19)$$

$$Pl2 = Pl2 - K2(|e^*-e|/e) \quad (20)$$

where, K1, K2: constants

As is apparent from the foregoing description, the step S13 is provided to increase a rate of change in the speed ratio e of the transmission 14, by increasing a difference between the first and second line pressures Pl1 and Pl2 as the error ($|e^*-e|/e$) increases. For instance, while the transmission 14 is operating in the positive-torque condition, the first line pressure Pl1 is higher than the pressure Pin in the first cylinder 26 (pressure in the cylinder on the drive shaft) by an amount equal to the extra value $\Delta$P1. However, this compensation value cannot be made so large, from the standpoint of avoiding the power loss of the pump 42. Accordingly, the difference between the first and second line pressures Pl1 and Pl2 may be insufficient for obtaining a sufficiently high rate of change in the speed ratio e. For this reason, the above line pressure difference is increased in step S13 while the transmission 14 is in a transient state wherein the error ($|e^*-e|/e$) is relatively large, i.e., equal to or larger than the predetermined value E. Thus, the present arrangement enables the transmission 14 to change its speed ratio e at a sufficiently high speed, permitting an improved operating response even in a transient state.

It will be noted that the compensation value K1($|e^*-e|/e$) of the equation (19) is equal to the proportioning term P of the equation (18) where the target value $\epsilon$ is zero. In step S13 which is executed when the transmission 14 is in a transient state, the control error ($|e^*-e|/e$) is comparatively large. In step S12, however, the error ($|e^*-e|/e$) is considerably small, since the transmission 14 is in a stable state with the speed ratio held at a substantially constant level. Hence, the proportional gain Kp used in the equation (18) is usually extremely larger than the constant K1 used in the equation (19).

After the desired first and second line pressures Pl1 and Pl2 have been determined as described above, step S14 is executed to determine the first and second line-pressure control values V1 and V2 according to the following equations (21) and (22), respectively. These equations are provided in the form of data map stored in the ROM 104, which represent functional relationships between the control values V1, V2 and the first and second line pressures Pl1, Pl2, which relationships are determined, with the operating characteristics of the first and second pressure regulating valves 48, 58 taken into account.

$$V1 = f(Pl1) \quad (21)$$

$$V2 = f(Pl2) \quad (22)$$

Figure 8:
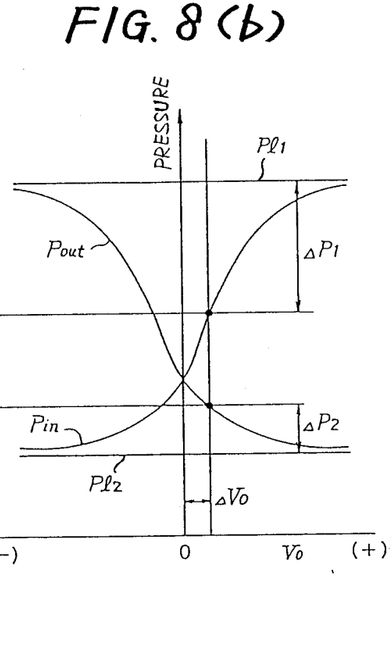
FIG. 8(a) is a view showing output characteristics of a shift-control valve used in the hydraulic control system of FIG. 1, while a difference between first and second line pressures is relatively small.
FIG. 8(b) is a view showing the same characteristics while the pressure difference is relatively large.

In the last step S15, the speed-ratio control value Vo, and the first and second line-pressure control values V1, V2, which have been determined in the previous steps, are applied to the shift-control valve 44, and the first and second pressure regulating valves 48, 58, as the SPEED-RATIO signals RA1, RA2, and as the VALVE DRIVE signals VD1, VD2, respectively. As a result, the speed ratio e, and the first and second line pressures Pl1 and Pl2, are controlled based on the applied signals RA1, RA2, VD1, VD2, as shown in FIGS. 6, 7 and 8. Thus, a control cycle is completed, and the control returns to the first step S1.

As described above, the present embodiment of the hydraulic control system is adapted such that the first line pressure Pl1 to be controlled by the first pressure regulating valve 48 is adjusted or compensated for by a feedback value, so that the determined error ($|e^* - e|/e$) of the speed ratio e coincides with the predetermined target value $\epsilon$. That is, the first line pressure P1 is controlled to a minimum level required for establishing the speed ratio e which includes the target error value $\epsilon$. Accordingly, the present arrangement permits reduced power loss of the pump 42 and consequently the engine 10, thus assuring improved fuel economy of the vehicle. In particular, the fuel economy is significantly improved, since the target error value $\epsilon$ is determined so as to minimize the fuel consumption of the engine 10.

Further, since the pre-compensated first line pressure P'l1 is adjusted based on the determined control error ($|e^* - e|/e$), the actual first line pressure Pl1 can be always controlled to the required minimum level, even if the first and second pressure regulating valves 48, 58 have errors in regulating the first and second line pressures Pl1, Pl2, or even if these regulating valves have varying operating characteristics. In other words, the present hydraulic control system assures a predetermined consistent relationship between the first line-pressure control value V1 and the actual first line pressure Pl1. This means that the present hydraulic control system does not necessarily require the regulating valves 48 and 58 and the shift-control valve 44 to have very high operating accuracy. Thus, the cost of manufacture of these valves may be reduced.

As described above, the feedback control of the desired first line pressure Pl1 is effected only while the transmission 14 is operating at a substantially constant or stable speed ratio e. If the feedback control is effected during an operation of the transmission 14 in a transient state, the actual first line pressure Pl1 would become unnecessarily high, since the error ($|e^* - e|/e$) in the transient state of the transmission 14 is considerably larger than that in the substantially stable state. Thus, the present hydraulic control system is adapted to avoid an excessive increase in the first line pressure while the transmission 14 is operating at a rapidly change speed ratio.

In the present embodiment, the steps S12, S14 and S15 executed by the controller 94 correspond to control means for effecting the feedback control of the first pressure regulating valve 48, for adjusting the desired first line pressure based on the error ($|e^* - e|/e$) of the speed ratio e of the transmission 14.

Another embodiment of the present invention will be described, by reference to FIG. 9.

Figure 2:
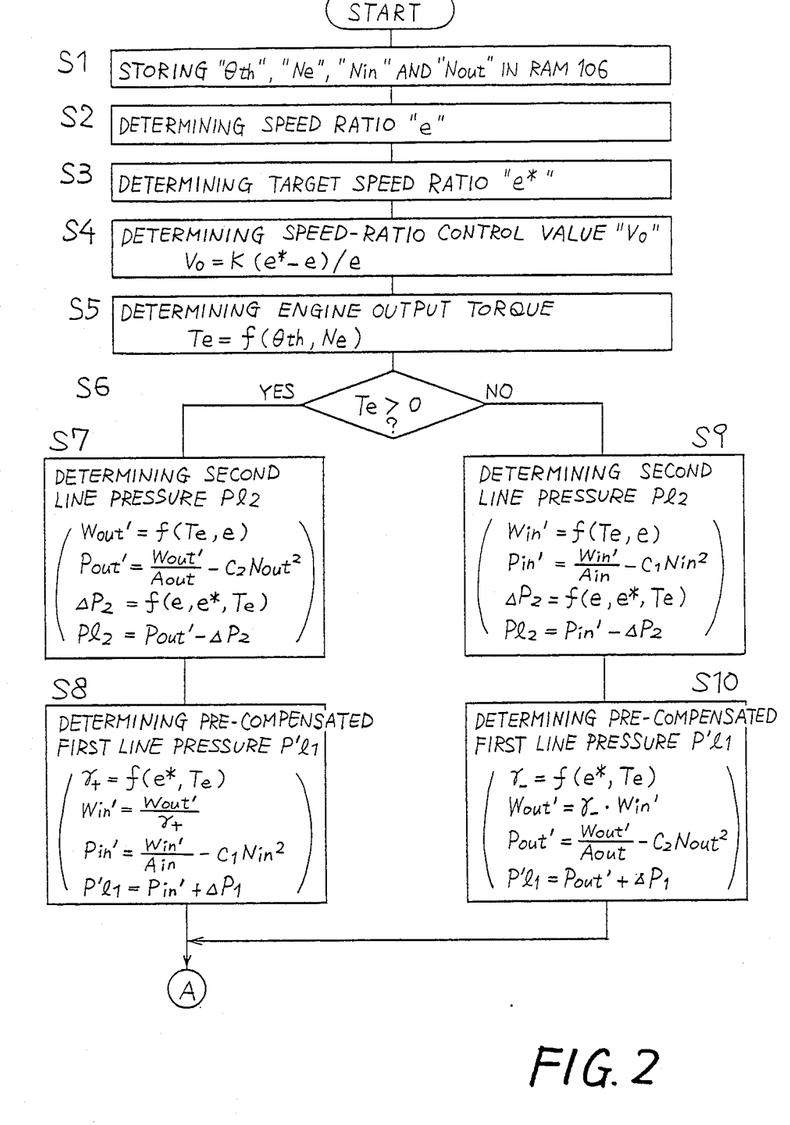
FIGS. 2 and 3 are flow charts illustrating operation of the embodiment of FIG. 1.
Figure 3:
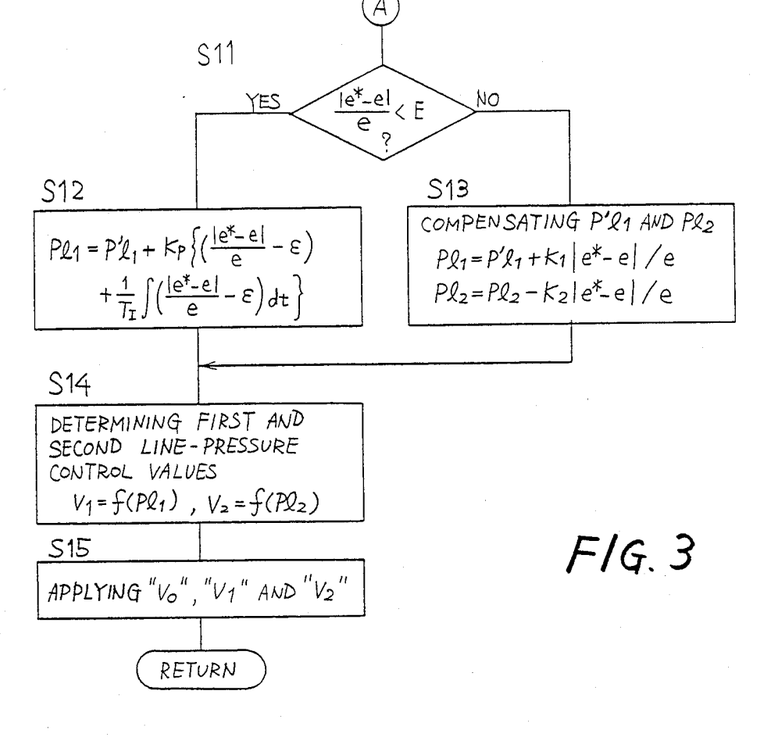
Figure 9:
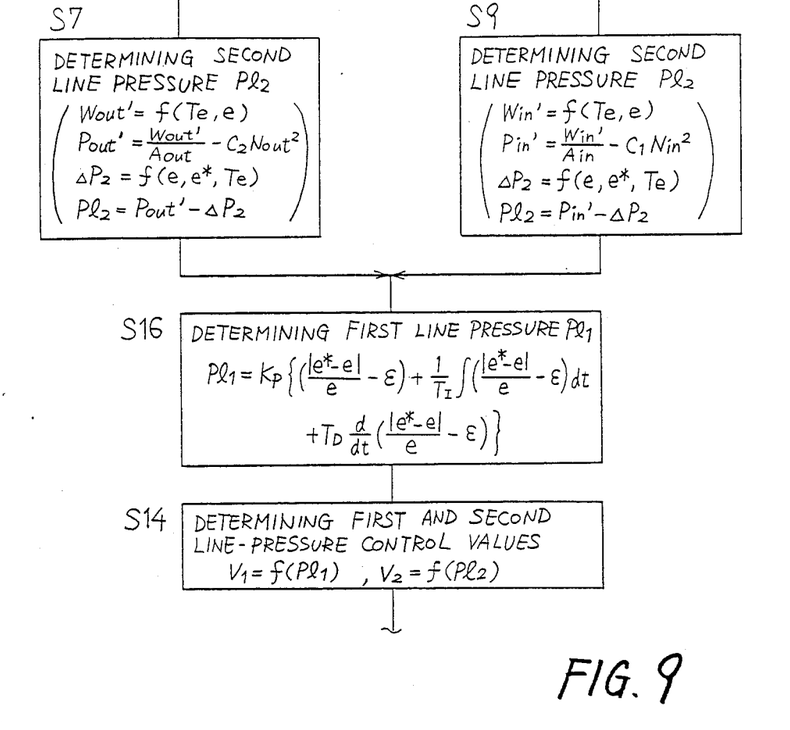
FIG. 9 is a flow chart showing the operation of another embodiment of the hydraulic control system of the invention.

In the flow chart of FIG. 9, step S16 is provided in place of steps S8, S10, S11, S12 and S13 used in the preceding embodiment of FIGS. 2 and 3. Described more specifically, the first line pressure Pl1 is determined in step S16 according to the following equation (23), after the second line pressure Pl2 has been determined in step S7 or S9.

$$Pl1 = Kp\{[(|e^*-e|/e) -\epsilon] + 1/Ti \int [(|e^*-e|/e) - \epsilon]dt + Td \cdot d/dt[e^*-e|/e) - \epsilon]\} \quad (23)$$

Like the preceding embodiment, the present modified embodiment is adapted to obtain the desired first line pressure P(1 to be established by the first pressure regulating valve 48, so that the error ($|e^* - e|/e$) coincides with the target value $\epsilon$, relying on the fact that the control error ($|e^* - e|/e$) decreases with an increase in the first line pressure Pl1, and increases with a decrease in the first line pressure Pl1. As in the preceding embodiment, the first line pressure is controlled to a required minimum level.

Contrary to the equation (18) used in step S12 of the preceding embodiment wherein the pre-compensated first line pressure P'l1 is calculated in step S8 or S10 prior to the execution of step S12, the equation (23) does not use a pre-compensated first line pressure P'l1. For this reason, the proportional gain Kp and a reset ratio 1/Ti used in the equation (23) must be larger than those used in the equation (18). In this case, the first line pressure Pl1 tends to have a relatively large amount of hunting. This problem is eliminated by the addition of a differential control action term D (third term of right side of the equation (23)) in the equation (23). Thus, the first line pressure is obtained as a sum of the proportional control action, integral control action and differential control action terms P, I and D. However, these three terms are not essential to determine the first line pressure. For instance, the equation (23) may use only the proportional control action or integral control action term P or I. In the equation (23), Td represents a differential time.

The present second embodiment wherein the first line pressure Pl1 is obtained by a single equation, i.e., equation (23), does not use complicated equational relations as used in the preceding embodiment, i.e., equations (7) through (10) or equations (14) through (17) for determining the pre-compensated first line pressure P'l1, based on the thrust ratio of the first and second hydraulic cylinders 26, 28. Thus, the first line pressure Pl1 can be comparatively readily obtained in the present embodiment, irrespective of whether the transmission 14 is operating in the positive-torque condition or in the engine-brake condition. Since the present embodiment also assures a consistent relation between the first line-pressure control value V1 and the first line pressure P1, the valves 44, 48, are not required to be very accurate, and the cost of these valves may be accordingly reduced, as previously indicated. In the present embodiment, the steps S16, S14 and S15 correspond to control means for effecting the feedback control of the first pressure regulating valve 48.

Figure 10:
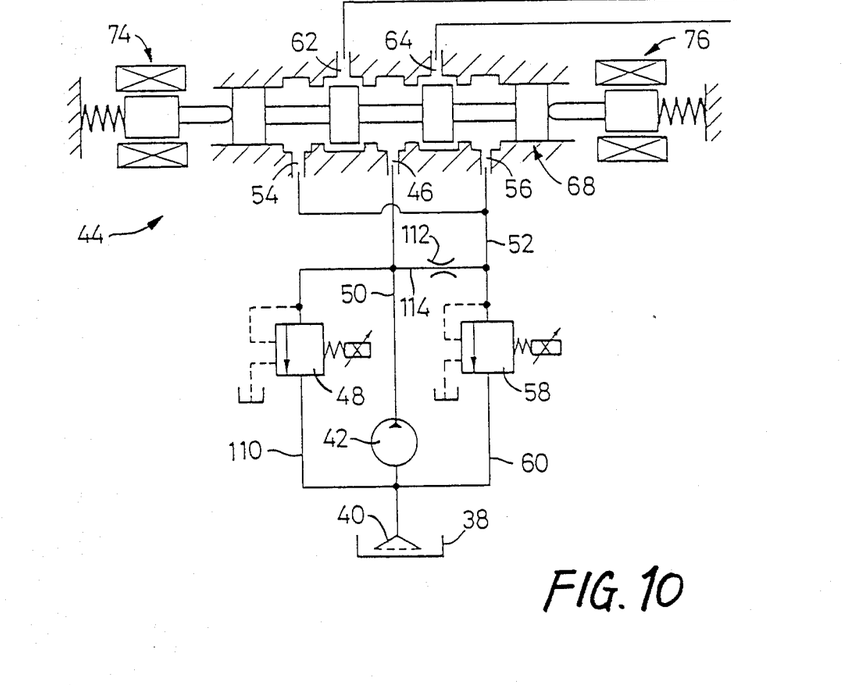
FIG. 10 is a fragmentary schematic view of a further embodiment of the invention, corresponding to a part of the arrangement of FIG. 1.

Referring next to FIG. 10, there is shown in FIG. 10 a hydrauliccontrol system for the belt-and-pulley type continuously variable transmission 14, wherein the first and second pressure regulating valves 48, 58 are disposed at different positions in the hydraulic circuit, than those used in the preceding embodiment of FIG. 1. Described in more detail, the first pressure regulating valve 48 is disposed so that the fluid in the first pressure line 50 may be released through the valve 48 directly to the suction side of the oil pump 42 through a drain line 110. The fluid delivered from the oil pump 42 through the first pressure line 50 is also fed to the second pressure line 52 through a line 114 in which a flow restrictor 112 is provided. This line 114 provides a flow of the fluid necessary to enable the second regulating valve 58 to function for controlling the second line pressure Pl2, and to assure a difference between the first and second line pressures Pl1 and Pl2. In other words, the second pressure regulating vale 58 operates to regulate the pressure of the fluid supplied through the line 114, and the pressure of the fluid discharged through the second drain port 56 of the shift-control valve 44. In the present embodiment, too, the first and second line pressures Pl1 and Pl2 are controlled to the required minimum levels, and the same advantages as described with respect to the embodiment of FIG. 1 can be enjoyed.

While the present invention has been described in its preferred embodiments, referring to the accompanying drawings, the invention may be otherwise embodied.

For example, the first and second hydraulic cylinders 26, 28 which have the same pressure-receiving areas may have different pressure-receiving areas.

As described above, the second pressure regulating valve 58 is used to regulate the second line pressure applied to one of the first and second hydraulic cylinders 26, 28 which has a lower pressure, depending upon whether the transmission 14 is operating in the positive-torque condition or in the engine-brake condition. For this reason, the different steps S7 and S9 using the different equations are executed to determine the second line pressure. However, when the two hydraulic cylinders 26, 28 have the same pressure-receiving areas, a common step may be executed prior to the step S6, in place of the two different steps S7 and S9 following the step S6. In this case, the pressure Pout' or Pin' obtained in steps S7 or S9 may be obtained based on the rotating speed Nout of the output shaft 18 of the transmission 14, because the vehicle usually runs in the positive-torque state with a drive torque transmitted from the engine 10 to the drive wheels.

For the same reason, a single common step may be used, in place of the two different steps S8 and S10 of FIG. 2 which are executed to determine the pre-compensated first line pressure P'l1, depending upon whether the vehicle is running in the positive-torque condition or in the engine-brake condition. Namely, the step S8 may be executed in both conditions, since this step S8 is followed by step S12 in which a substantially optimum value of the first line pressure Pl1 is obtained by means of the feedback compensation, irrespective of whether the vehicle is running in the positive-torque or engine-brake condition.

In the illustrated embodiments, the control error $(|e^*-e|/e)$ is used for the feedback control. However, an error $|e^*-e|$ may be used. Further, since a relation between the speed ratio e and the rotating speed Nin of the input shaft 16 (or engine speed Ne) is fixed once the rotating speed Nout of the output shaft 18 is determined, the feedback control may be effected based on an error $(|Nin-Nin^*|/Nin^*)$, i.e., a difference between the rotating speed Nin and a target speed Nin*, divided by the target speed Nin*. This modified arrangement provides substantially the same results as obtained where the error $(|e^*-e|/e)$ is controlled to coincide with the target value $\epsilon$.

While the proportioning constants K1 and K2 are used in step S13 of FIG. 3, these constants may be replaced by variables which are determined as a function of the speed ratio e, output torque Te, engine speed Ne and vehicle speed V.

While the shift-control valve 44 in the illustrated embodiments is controlled so that the speed ratio e coincides with the target speed ratio e*, it is possible to control the shift-control valve 44 so that the rotating speed Nin of the input shaft 16 coincides with a target speed Nin* determined in step S3, or so that the actual drive force of the vehicle coincides with a required output of the vehicle.

Although the illustrated embodiments uses the throttle position $\theta$th as a variable representing the currently required output of the vehicle, this parameter may be replaced by an operating amount of an accelerator pedal, where the vehicle is provided with a diesel engine.

In the illustrated embodiments, the shift-control valve 44 provides an output which is proportional with a continuously changed position of the valve spool 68. However, it is possible to continuously change the duty ratio of the shift-control valve. In this case, the valve spool 68 is activated either directly by the solenoids 74, 76, or by means of comparatively small-sized pilot-operated solenoid valves.

While the shift-control valve 44 uses the single valve spool 68, the valve 44 may incorporate two or more spools.

In the illustrtated embodiments, the valve spool 68 of the shift-control valve 44 is activated by the first and second solenoids 74, 76, it is possible to use other types of electromagnetic actuators such as a stepping motor.

While the target error value $\epsilon$ used in the illustrated embodiments are determined so as to minimize the fuel consumption of the vehicle, the value $\epsilon$ may be otherwise determined, provided that the principle of the present invention may be practiced, so as to regulate the first line pressure by means of a feedback control so that the error between the actual and target speed ratios of the transmission is made equal to the predetermined target value. Namely, the first line pressure is controlled to a minimum level required to establish the actual speed ratio including the predetermined target error value, so as to improve the fuel economy of the vehicle.

It is to be understood that the invention is not limited to the details of the illustrated embodiments, but various other changes and modifications may be made in the invention, without departing from the spirit and scope of the invention defined in the following claims.

What is claimed is:

1. A hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, said hydraulic control system comprising:

a hydraulic pressure source for pressurizing a working fluid;

a first pressure regulating valve for regulating a pressure of said fluid from said hydraulic pressure source, and thereby establishing a first line pressure in a first pressure line;

a shift-control valve receiving said first line pressure of said first pressure line, and applying said first line pressure to one of said first and second hydraulic cylinders, while simultaneously permitting a flow of the fluid from the other hydraulic cylinder, thereby changing the effective diameters of said first and second pulleys to control a speed ratio of said transmission;

a second pressure regulating valve for establishing a second line pressure in a second pressure line connected to said shift-control valve, by regulating a pressure of the fluid flowing from said other hydraulic cylinder through said shift-control valve, said second line pressure being lower than said first line pressure; and control means for controlling said shift-control valve so that an actual speed ratio of said transmission coincides with a target speed ratio determined depending upon a running condition of the vehicle, said control means being operable for effecting a feedback control of said first pressure regulating valve, to regulate said first line pressure so that a control error between said actual speed ratio and said target speed ratio of the transmission coincides with a predetermined constant target value.

2. A hydraulic control system according to claim 1, wherein said control means determines said first line pressure according to the following equation:

$Pl1 = Kp\{[(|e^*-e|/e) - \epsilon] + 1/Ti \int [(|e^*-e|/e) - \epsilon]dt + Td \cdot d/dt[(|e^*-e|/e) - \epsilon]\}$ where, Pl1: said first line pressure
Kp: proportional gain
e: said actual speed ratio of the transmission
e*: said target speed ratio of the transmission ($|e^*-e|/e$): said control error
$\epsilon$: said predetermined constant target value
Ti: integration time
Td: differentiation time.

3. A hydraulic control system according to claim 1, wherein said control means determines said first line pressure by adding a compensation value to a pre-compensated value of said first line pressure, according to the following equation:

$Pl1 = P'l1 + Kp\{[(|e^*-e|/e) - \epsilon] + 1/Ti \int [(|e^*-e|/e) - \epsilon]dt\}$ where, Pl1: said first line pressure P'l1: said pre-compensated value of said first line pressure
Kp: proportional gain
e: said actual speed ratio of the transmission
e*: said target speed ratio of the transmission
($|e^*-e|/e$): said control error
$\epsilon$: said predetermined constant target value
Ti: integral time.

4. A hydraulic control system according to claim 3, wherein said control means includes means for determining a pressure Pin' or Pout' in said one of the first and second hydraulic cylinders, based on said target speed ratio e*, an actual output torque Te of said transmission, a pressure-receiving area Ain or Aout of said first and second hydraulic cylinders, and a rotating speed Nin or Nout of said first or second shaft, and according to a predetermined relation formulated to enable said one hydraulic cylinder to provide a thrust necessary to establish said target speed ratio e* of the transmission, said control means further including means for determining said pre-compensated value P'l1 of said first line pressure by adding an extra value ΔP1 to said pressure Pin' or Pout'.

5. A hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, said hydraulic control system comprising:

a hydraulic pressure source for pressurizing a working fluid;

a first pressure-regulating valve for regulating a pressure of said fluid from said hydraulic pressure source, and thereby establishing a first line pressure in a first pressure line;

a shift-control valve receiving said first line pressure of said first pressure line, and applying said first line pressure to one of said first and second hydraulic cylinders, while simultaneously permitting a flow of the fluid from the other hydraulic cylinder, thereby changing the effective diameters of said first and second pulleys to control a speed ratio of said transmission;

a second pressure regulating valve for establishing a second line pressure in a second pressure line connected to said shift-control valve, by regulating a pressure of the fluid flowing from said other hydraulic cylinder through said shift-control valve; and control means for controlling said shift-control valve so that an actual speed ratio of said transmission coincides with a target speed ratio determined depending upon a running condition of the vehicle, said control means being operable for effecting a feedback control of said first pressure regulating valve, to regulate said first line pressure so that a control error between said actual speed ratio and said target speed ratio of the transmission coincides with a predetermined constant target value, said control means determining said first line pressure according to an equation which includes a proportional control action term representing a variable which is proportional to a difference between said control error and said predetermined constant target value, said control means controlling said first pressure regulating valve so as to establish the determined first line pressure.

6. A hydraulic control system according to claim 5, wherein said equation further includes an integral control action term representing a variable which is proportional to an integral of said difference.

7. A hydraulic control system according to claim 5, wherein said equation further includes a differential control action term representing a variable which is proportional to a derivative of said difference.

* * * * *